United States Patent Office 3,419,634
Patented Dec. 31, 1968

3,419,634
ORGANOPOLYSILOXANE POLYCARBONATE
BLOCK COPOLYMERS
Howard A. Vaughn, Jr., Schenectady, N.Y., assignor to
General Electric Company, a corporation of New
York
No Drawing. Filed Jan. 3, 1966, Ser. No. 517,920
14 Claims. (Cl. 260—824)

ABSTRACT OF THE DISCLOSURE

Compositions comprising organopolysiloxane-polycarbonate block copolymers having either terminal aliphatically unsaturated radicals, or block copolymers having terminal radicals free of aliphatic unsaturation which consist essentially of organopolysiloxane blocks joined to polycarbonate blocks by silicon-carbon bonds. The compositions of the present invention can contain organic solvent, filler, etc., and can be used to make flexible windows for vehicles, substitutes for acrylic denture bases, etc.

---

The present invention relates to compositions comprising organopolysiloxane-polycarbonate block copolymers and a method for making them.

Compositions of the present invention comprise organopolysiloxane-polycarbonate block copolymers selected from (A) copolymers having terminal monovalent aliphatically unsaturated organo radicals referred to hereinafter as the "unsaturated copolymers" and (B) copolymers having terminal radicals of the formula, (1)               RO where R is selected from hydrogen and monovalent organo radicals free of aliphatic unsaturation referred to hereinafter as the "saturated copolymers" which are composed of polycarbonate blocks chemically combined with organopolysiloxane blocks having terminal

units, where R' is selected from monovalent hydrocarbon radicals, halogenated monovalent hydrocarbon radicals, and cyanoalkyl radicals, R" is selected from divalent hydrocarbon radicals and halogenated divalent hydrocarbon radicals, and Y is a divalent radical selected from

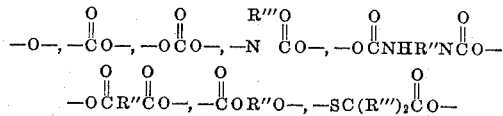

etc., where R''' is hydrogen or an alkyl radical.

The "block copolymers" of the present invention which will hereinafter signify both the unsaturated copolymers and the saturated copolymers comprise (C) from 1 to 95 percent by weight of organopolysiloxane composed of blocks consisting essentially of chemically combined diorganosiloxy units of the formula, (2)               R'$_2$SiO and (D) from 5 to 99 percent by weight of blocks of the reaction product of a dihydroxy compound of the formula, (3)               HOZOH and a member selected from a carbonyl halide and a diaryl carbonate, where R' is defined above, Z is selected from R" and R"QR", R" is as previously defined, Q is a divalent radical selected from

divalent cycloaliphatic radicals, oxyaryleneoxy radicals, sulfonyl, sulfinyl, oxy, thio, etc. For purposes of defining the block copolymers of the invention with respect to the percent by weight of the organopolysiloxane blocks in the copolymer, based on the total weight of the copolymer, the weight of organopolysiloxane will be defined in terms of chemically combined organosiloxy units even though prior to phosgenation OZOH radicals can be attached to the organopolysiloxane blocks. Copolymers having R"Y linkages between the organopolysiloxane blocks and polycarbonate blocks will have the weight of the R"Y linkage included in the weight of the organopolysiloxane blocks. The weight of the terminal radicals of the copolymer will be included in the weight of the polycarbonate blocks.

Radicals included by R are for example, monovalent aryl radicals and halogenated monovalent aryl radicals such as phenyl, chlorophenyl, tolyl, naphthyl, etc.; aralkyl radicals such as benzyl, phenylethyl, etc.; saturated aliphatic radicals, cycloaliphatic radicals, and haloaliphatic radicals, for example, alkyl radicals such as methyl, ethyl, propyl, chloropropyl, trifluoropropyl, butyl, pentyl, hexyl, octyl, etc.; cycloalkyl radicals such as cyclobutyl, cyclohexyl, cycloheptyl, etc. Radicals included by R' are all of the aforementioned R radicals as well as unsaturated aliphatic and cycloaliphatic radicals, for example, vinyl, allyl, propenyl, etc.; cyclohexenyl, cycloheptenyl, etc.; cyanoalkyl radicals such as cyanoethyl, cyanopropyl, cyanobutyl, etc. Radicals included by R" are divalent aryl radicals and halogenated divalent aryl radicals, such as for example, phenylene, tolylene, chlorophenylene, divalent alkylenearylene such as ethylenephenylene, propylenephenylene, etc., alkylene radicals such as methylene, ethylene, propylene, etc., R''' radicals include all of the alkyl radicals shown by R above. In the above formulae, where R, R', R", R''', Y and Z can represent more than one radical, these radicals can be all the same or any two or more of the aforementioned radicals respectively.

Included by the unsaturated copolymers of the present invention, are copolymers having terminal radicals of the formula, (4)             

where R" and Y are as defined above, V is selected from hydrogen, monovalent hydrocarbon radicals and halogenated monovalent hydrocarbon radicals included by R' above, $a$ can be 1 or 2, $b$ can be 0 or 1, and $$CV_a - C^{V_b}$$

can be part of an olefinically or acetylenically unsaturated aliphatic or cycloaliphatic radical.

The preferred way of making the unsaturated copolymers of the invention is by phosgenating a mixture comprising (E) the dihydroxy compound of Formula 3, (F) an organopolysiloxane of the formula, (5)             

and (G) an aliphatically unsaturated monohydroxy compound of the formula, (6)             

where R', R'', V, $a$ and $b$ are as defined above, $n$ is an integer equal to 5 to 500, inclusive, and Y' can be selected from $$-OZOH, \quad -R''OH, \quad -R''NH\overset{O}{\overset{\|}{C}}OZOH-, \quad -R''\overset{O}{\overset{\|}{C}}OH$$

$$-R''\overset{O}{\overset{\|}{C}}OZOH, \quad -R''NH\overset{O}{\overset{\|}{C}}O, \quad -R''O\overset{O}{\overset{\|}{C}}NHR''HN\overset{O}{\overset{\|}{C}}OZOH, \text{ etc.}$$

In Formula 5 where Y' can provide for R''Y linkages between organopolysiloxane blocks and polycarbonate blocks, R'' is preferably alkylene, divalent cycloalkane, alkylenearylene, and halogenated derivatives thereof such as for example, ethylene, propylene, butylene, etc., cyclobutylene, cyclopentylene, etc., ethylenephenylene, propylenechlorophenylene, etc.

The organopolysiloxanes of Formula 5 having terminal OZOH radicals can be made by effecting reaction between a halogen-terminated organopolysiloxane of the formula, (7)
$$X-\left(\underset{R'}{\overset{R'}{\underset{|}{\text{Si}}}O}\right)_n\underset{R'}{\overset{R'}{\underset{|}{\text{Si}}}}X$$

where X is a halogen radical, and the dihydroxy compound of Formula 3 in accordance with the method shown in my Patent 3,189,662 assigned to the same assignee as the present invention.

The preferred dihydroxy compounds of Formula 3 are bisphenols of the formula, (8)
$$HO-\overset{(W)_e}{\underset{(W)_e}{\bigcirc}}\overset{V}{\underset{V}{\overset{|}{C}}}\overset{}{\bigcirc}-OH$$

where V is defined above, W is selected from alkyl radicals and X as defined above, and $e$ is a whole number equal to 0 to 4, inclusive.

The organopolysiloxanes of Formula 5 which are free of terminal OZOH radicals bonded to silicon as shown by the formula, (9)
$$HOR''-\left(\underset{R'}{\overset{R'}{\underset{|}{\text{Si}}}O}\right)_n\underset{R'}{\overset{R'}{\underset{|}{\text{Si}}}}R''OH$$

form carbonate linkages when phosgenated with dihydroxy compounds of Formula 3. These organopolysiloxanes can be made by equilibrating cyclopolysiloxanes of the formula, $$\left[\underset{R'}{\overset{R'}{\underset{|}{\text{Si}}}O}\right]_m$$

where R' is defined above, and $m$ is an integer equal to 3 to 20, with 2,2 - diorgano - 1-oxa-2-silacycloalkanes such as 2,2 - dimethyl - 1 - oxa - 2 - silacyclohexane, 2,2 - diphenyl - 1 - oxa - 2 - silacyclohexane, etc. These silacycloalkanes are taught by R. P. Anderson, Patent 3,083,219, assigned to the same assignee as the present invention. In addition, organopolysiloxanes included by Formula 9 also can be made by effecting addition between an olefinically unsaturated monohydroxy compound such as shown by Formula 6 and an organopolysiloxane of the formula, $$H-\left(\underset{R'}{\overset{R'}{\underset{|}{\text{Si}}}O}\right)_n\underset{R'}{\overset{R'}{\underset{|}{\text{Si}}}}H$$

where all the terms are defined above. Details of this method are shown in the copending application (Docket No. 8DW-545) of K. W. Krantz, filed concurrently herewith and assigned to the same assignee as the present invention. In addition, direct equilibration of lower molecular weight addition products such as a tetraorganodisiloxane corresponding to Formula 9 and the above shown cyclopolysiloxanes also can be employed.

In addition to the organopolysiloxanes of Formula 9 having terminal organohydroxy radicals which provide for block copolymers having carbonate linkages, the organopolysiloxanes of Formula 5 also include organopolysiloxanes having terminal ester linkages of the formula,

(10)
$$HOZO\overset{O}{\overset{\|}{C}}R''-\left(\underset{R'}{\overset{R'}{\underset{|}{\text{Si}}}O}\right)_n\underset{R'}{\overset{R'}{\underset{|}{\text{Si}}}}R''\overset{O}{\overset{\|}{C}}OZOH$$

where all the terms shown are as previously defined. These organopolysiloxanes having terminal ester linkages are preferably made by effecting reaction between an organopolysiloxane acid halide of the formula, $$X\overset{O}{\overset{\|}{C}}R''-\left(\underset{R'}{\overset{R'}{\underset{|}{\text{Si}}}O}\right)_n\underset{R_7}{\overset{R'}{\underset{|}{\text{Si}}}}R''\overset{O}{\overset{\|}{C}}X$$

and the dihydroxy compound of Formula 3 in the presence of an acid acceptor such as pyridine. Organopolysiloxane acid halides can be made by equilibrating mixtures of cyclopolysiloxanes with carboxy terminated tetraorganodisiloxanes and converting the resulting organopolysiloxane having terminal carboxy radicals to the above shown organopolysiloxane acid halide. A halogenating agent can be employed in accordance with the method of Bailey et al. Patent 3,119,855.

A further example of organopolysiloxanes included by Formula 5 are organopolysiloxane polymers having terminal urethane linkages of the formula, $$Y''OR''-\left(\underset{R'}{\overset{R'}{\underset{|}{\text{Si}}}O}\right)_n\underset{R'}{\overset{R'}{\underset{|}{\text{Si}}}}R''OY''$$

where Y'' can be for example, $$\overset{O}{\overset{\|}{C}}NH-\bigcirc-\underset{V}{\overset{V}{\underset{|}{C}}}-\bigcirc-OH$$
$$O=C\overset{}{\underset{NH}{\bigcirc}}$$

An additional method which can be employed to make the organopolysiloxane-polycarbonate block copolymers of the present invention is by transesterification with diaryl carbonate and dihydroxy compounds of Formula 3. This method is described on pages 44–51 of Chemistry and Physics of Polycarbonates by Herman Schnell, Interscience Publishers, John Wiley and Sons, New York (1964). A further method which can be employed is by direct phosgenation of a mixture of dihydroxy compounds of Formula 3 and organopolysiloxanes of Formula 5 having terminal carboxy radicals in place of Y radicals.

Further examples of isocyanates which can provide for urethane linkages are for example, aliphatically unsaturated isocyanates such as, $$CH_2=CHCH_2-\bigcirc-N\overset{O}{\overset{\|}{C}}, \quad CH_2=CHCH_2O-\bigcirc-N\overset{O}{\overset{\|}{C}}$$

$$\underset{CH-CH_2}{\overset{CH-CH_2}{\underset{\diagdown}{\diagup}}}CHN\overset{O}{\overset{\|}{C}}, \quad CH_2=CHN\overset{O}{\overset{\|}{C}}, \quad CH_2=CHCH_2N\overset{O}{\overset{\|}{C}}$$

$$CH_2=CH(CH_2)_2N\overset{O}{\overset{\|}{C}}, \text{ etc.,}$$

polyisocyanates, such as, $$\overset{O}{\overset{\|}{C}}N-\bigcirc-CH_3, \quad \underset{NC=O}{\overset{NC=O}{\bigcirc}}-CH_3$$

$$\overset{O}{\overset{\|}{C}}N-\bigcirc-CH_2-\bigcirc-N\overset{O}{\overset{\|}{C}}, \quad \overset{O}{\overset{\|}{C}}N(CH_2)_6N\overset{O}{\overset{\|}{C}}, \text{ etc.,}$$

Examples of olefinically unsaturated hydroxy compounds included by Formula 6 are,

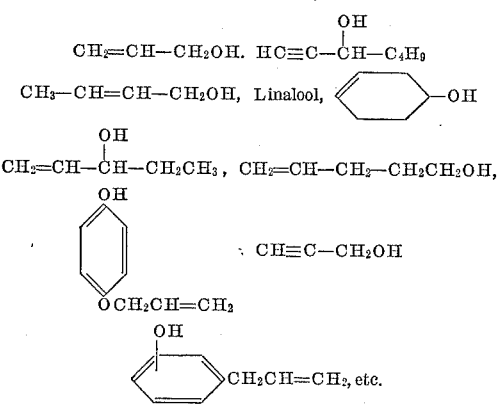

There are included by the bisphenols of Formula 8, 2,2-bis(4-hydroxyphenyl)propane (Bisphenol-A); 2,4-dihydroxydiphenylmethane; bis(2-hydroxyphenyl)methane; bis(4-hydroxyphenyl)methane; 1,1-bis(4-hydroxyphenyl)ethane; 1,2-bis(4-hydroxyphenyl)ethane; 1,1-bis(4-hydroxy-2-chlorophenyl)ethane; 1,1-bis(2,5-dimethyl-4-hydroxyphenyl)ethane, 1,3-bis(3-methyl-4-hydroxyphenyl) propane; 2,2-bis(3-isopropyl-4-hydroxyphenyl)propane, 2,2-bis(4-hydroxyphenyl)hexylfluoropropane, etc. In addition, 4,4'-sec-butylidenediphenol, 4,4'-methylene(2,6-ditert-butylphenol), 2,2'-methylene(4-methyl-6-tert-butylphenol), bis(4-hydroxyphenyl)phenylmethane, bis(4-hydroxyphenyl)cyclohexyl methane, 1,2-bis(4-hydroxyphenyl)-1,2-diphenyl ethane, etc. In addition to the above bisphenols there are also included within the scope of the dihydroxy compounds of Formula 3 dihydroxy benzenes such as hydroquinone resorcinol, etc., 4,4'-dihydroxydiphenyl, 2,2'-dihydroxydiphenyl, 2,4'-dihydroxydiphenyl, etc.

In addition to the bisphenols of Formula 8 further examples of dihydroxy compounds included by Formula 3 are shown on page 69 of Chemistry and Physics of Polycarbonates by Herman Schnell as previously cited. For example, such dihydroxy compounds are included by

where Q can be for example, 1,1-cyclopentyl, —O—, —OC₆H₅O—, —S—,

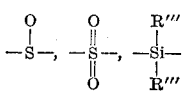

etc. For example, dihydroxysulfones, such as bis(4-hydroxyphenyl)sulfone, 2,4'-dihydroxydiphenylsulfone, 5'-chloro-2,4'-dihydroxydiphenylsulfone, 5'-chloro-2',4-dihydroxydiphenylsulfone, etc. In addition, dihydroxy aromatic ethers are included such as 4,4'-dihydroxytriphenyl ether, the 4,3'-4,2'-, 3,3'-, 2,2'-2,3'-, etc. dihydroxydiphenyl ethers, 4,4'-dihydroxy-2,5-dimethyldiphenyl ether, etc.

The block copolymers of the present invention are thermoplastic materials. These copolymers have a weight per cent of from 1 to 95 percent by weight of organopolysiloxane blocks based on the weight of copolyer. Depending upon the weight percent of organopolysiloxane of the copolymer, the copolymers can be rubbery, or extrudable into fibers or cast from organic solvent solutions into films. For example, copolymers having a weight percent of from 50 to 95 organopolysiloxane, based on the total weight of organopolysiloxane and polycarbonate, can be employed as organopolysiloxane elastomers in particular applications. A proportion of from 1 to 60 percent by weight of organopolysiloxane based on the total weight of copolymer can be extruded into fibers, cast or sprayed from organic solvent solutions into thermoplastic films, etc. Suitable organic solvents for the copolymers of the invention are for example, methylene chloride, chloroform, sym-tetrachloroethane, tetrahydrofuran, dioxane, etc.

In some instances, the block copolymers of the present invention also can be milled with standard fillers such as reinforcing and non-reinforcing fillers. For example, silica fillers, such as fume silica, precipitated silica, etc., zinc oxide, carbon black, titania, etc. can be incorporated by milling, or blending with the copolymer to achieve additional benefits such as improved tensile strength, abrasion resistance, etc.

Included among the applications to which the copolymers of the invention can be employed are roof coatings, coatings for aluminum sidings, flexible windows for vehicles, substitutes for acrylic denture bases with soft rubbery liners, tire cords, thermoplastic binder for safety glass, transparent rubber gaskets for glass, etc.

A significant advantage provided by the unsaturated copolymers of the present invention is that they can be converted from thermoplastic materials to thermoset materials by employing peroxide curing catalysts, such as dicumyl peroxide, t-butylperbenzoate, benzoyl peroxide, etc. The unsaturated copolymers also can be converted to room temperature curable compositions as shown in my copending application (Docket No. 8DW-531), filed concurrently herewith, by the platinum catalyzed addition of a silicon hydride having hydrolyzable radicals such as acyloxy radicals attached to silicon.

The unsaturated copolymers of the present invention also can be cured by cross-linking with organosilicon materials having hydrogen attached to silicon in the presence of a platinum catalyst. Silicon hydrides such as methylpolysiloxane containing chemically combined methylhydrogensiloxy units H(CH₃)SiO, etc., can be utilized. Suitable platinum catalysts are those described in Ashby Patent 3,159,601, Lamoreaux Patent 3,220,972, both assigned to the same assignee as the present invention, Speier et al. Patent 2,823,218, Bailey et al. Patent 2,970,150, etc.

A further feature of the present invention is that copolymers composed of polycarbonate blocks chemically combined with organopolysiloxane blocks having terminal

units show significantly improved hydrolytic stability over prior art organopolysiloxane-polycarbonate copolymer such as shown by Goldberg Patent 3,161,615, assigned to the same assignee as the present invention. As it is well known to those skilled in the art, a silicon-carbon bond between the polycarbonate block and organopolysiloxane block, as provided by the R″Y linkages of the copolymers of the present invention are significantly more stable than the carbonate linkages between the organopolysiloxane blocks and the polycarbonate blocks present in the aforementioned copolymers of Goldberg.

In the practice of the invention the block copolymers can be made by phosgenating a mixture of the dihydroxy compound of Formula 3 and the organopolysiloxane of Formula 5. A proportion of from 0.01 part to 20 parts of the organopolysiloxane, per part of the dihydroxy compound can be employed. In instances where it is desired to make the unsaturated copolymer, aliphatically unsaturated monohydroxy compound of Formula 6 can be utilized before the reaction mixture is hydrolyzed. For example, it can be phosgenated with the dihydroxy compound and organopolysiloxane, or it can be added after phosgenation to eliminate chlorocarbonate radicals. After hydrolysis, the unsaturated copolymer can be made by utilizing an aliphatically unsaturated isocyanate, or a polyisocyanate in combination with an aliphatically unsaturated hydroxy compound of Formula 7.

During phosgenation experience has shown that substantially anhydrous conditions should be maintained to provide for optimum results. Agitation of the mixture as well as the employment of a suitable organic solvent has been found to facilitate the formation of copolymer. A suitable organic solvent includes for example, chlorobenzene, methylene chloride, etc., while any organic solvent that is inert to the reactants and sufficiently high in boiling point to achieve satisfactory results can be employed. A temperature between 0° C. to 200° S., can be utilized during phosgenation, and preferably a temperature between 20° C. to 100° C. Phosgenation can be continued until no further increase in the viscosity of the mixture is experienced or until the introduction of phosgene into the mixture results in no further reaction. Separation of the copolymer can be effected by conventional precipitation, washing and filtering procedures. In the absence of the employment of the unsaturated monohydroxy compound of Formula 6, the saturated copolymer can be recovered by employing water or a monohydroxy compound, ROH, where R is defined above.

In order that those skilled in the art may be better able to practice the present invention, the following examples are given by way of illustration and not by way of limitation. All parts are by weight.

Example 1

A mixture of 1480 parts of octamethylcyclotetrasiloxane and 260 parts of 2,2-dimethyl-1-oxa-2-silacyclohexane is heated at 180° C. for 2 hours in the presence of 1.8 part of potassium hydroxide. The resulting product is clear and homogeneous. When the product cools below 40° C. it is hydrolyzed with acetic acid. The resulting oil is then neutralized and dried with soda ash and filtered through diatomaceous earth. Based on method of preparation, there is obtained a polydimethylsiloxane having an average of about 20 chemically combined dimethylsiloxy units and terminal

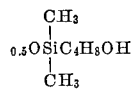

units.

A mixture of 23 parts of 2,2-bis(4-hydroxyphenyl)-propane, 25 parts of pyridine, 390 parts of methylene chloride, and 30 parts of the above hydroxybutyldimethylsiloxy terminated polydimethylsiloxane was phosgenated for about 45 minutes utilizing a rate of about 0.23 part of phosgene per minute. Rate of phosgenation was then reduced to 0.08 part of phosgene per minute over an additional 45 minutes. During the phosgenation, the mixture was vigorously stirred.

At the termination of the phosgenation, 450 parts of methanol were added to the mixture. A product precipitated. Based on method of preparation, the product was a saturated polydimethylsiloxane-polycarbonate copolymer having terminal methyl carbonate radicals consisting of about 53.5 percent by weight of organopolysiloxane composed of polydimethylsiloxane blocks having terminal 4-(dimethylsiloxy)butoxy units chemically combined with 46.5 percent by weight of polycarbonate blocks based on the weight of copolymer. The copolymer was washed four times with methanol and then dried overnight at 85° C. There was obtained 39.8 parts of copolymer which represented a 72 percent yield based on starting reactants. The copolymer was cast from a chloroform solution into a strong, tough, clear film. The film had an average tensile strength at break of 845 p.s.i. and an elongation of 90 percent.

The copolymer is dissolved in chloroform to form a 10 percent solution of copolymer based on the weight of the solution. The solution is sprayed onto an aluminum substrate and allowed to evaporate. A tough thermoplastic film valuable as a roof coating is formed on the aluminum substrate.

Example 2

There were added over a 2 hour period, a mixture of 100 parts of water and 206 parts of dioxane to 800 parts of dimethyldichlorosilane. While the resulting mixture was stirred, it was heated to a general reflux until it became homogeneous. It was stripped in vacuo to a pot temperature of 202° C. at 12 mm. pressure. Based on its hydrolyzable chlorine content 4.6 percent, the resulting chlorine chain-stopped polydimethylsiloxane had about 19 chemically combined dimethylsiloxy units.

A solution of 225 parts of the above chlorine chain-stopped polydimethylsiloxane in 134 parts of dry methylene chloride was added to a mixture of 114 parts of 2,2-bis(4-hydroxyphenyl)propane, 1340 parts of methylene chloride and 130 parts of dry pyridine. The addition was performed over a period of 65 minutes while the resulting mixture was vigorously agitated. Based on method of preparation, there was obtained a polydimethylsiloxane having the average formula

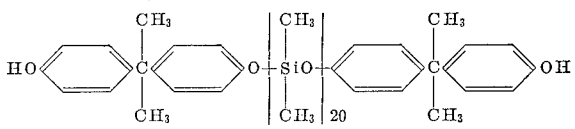

The mixture was phosgenated at a rate of about 0.74 part of phosgene per minute over a 50 minute period. During the phosgenation, the temperature rose to 38° C. Phosgenation was continued until phosgene was detected in the exit gases. The mixture was then purged with nitrogen. An aqueous solution of pyridine was added. A product was precipitated by adding methanol to the mixture. The product was then washed four times with additional methanol. After drying at 100° C., its intrinsic viscosity in chloroform was found to be 0.23 dl./g. Based on method of preparation, the product was a saturated polydimethylsiloxane-polycarbonate copolymer having terminal

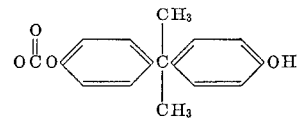

radicals. The copolymer was composed of 64 percent by weight of polydimethylsiloxane blocks of the average formula,

chemically combined with 36 percent by weight of polycarbonate blocks based on the total weight of copolymer.

There were added 1.83 parts of allyl isocyanate to a solution of 50 parts of the above-described saturated copolymer and 250 parts of dry toluene, in the presence of 0.02 part of dibutyltindilaurate. While substantially anhydrous conditions were maintained, the mixture was heated for 22 hours at 100° C. and an additional 0.02 part of dibutyltindilaurate was added. After 39 hours of additional reflux, utilizing 0.06 part of zirconium octoate, infrared indicated that the mixture was free of isocyanate. Based on method of preparation an unsaturated copolymer was obtained having terminal

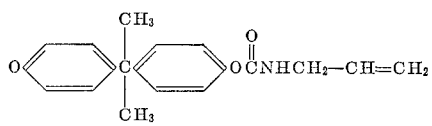

radicals.

Example 3

There were added over a period of 70 minutes with stirring 225 parts of the chlorine chain-stopped dimethylsiloxane of Example 2 to a mixture of 114 parts of 2,2-bis-(4-hydroxyphenyl)propane and 130 parts of dry pyridine, and 1300 parts of methylene chloride. When this addition was completed 1.3 part of allyl alcohol was added to the mixture. Phosgene was passed into the mixture until the presence of phosgene in the exit gases indicated that the reaction had gone to completion. Nitrogen was then passed into the mixture of about 15 minutes to purge out excess phosgene. Another 4.3 parts of allyl alcohol were added to the mixture a solution of 5 parts of pyridine in 12 parts of water. Methanol was then added to the mixture to effect precipitation of product which was washed three times with additional methanol. After drying at 100° C. the product was found to have a tensile of 185 p.s.i. and an elongation of 175 percent. Based on method of preparation, the product was an unsaturated copolymer composed of 64 percent by weight of polydimethylsiloxane blocks of the average formula,

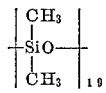

chemically combined with 36 percent by weight of polycarbonate blocks based on the weight of copolymer. The copolymer also had terminal

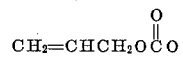

radicals joined to polycarbonate blocks.

In place of allyl alcohol utilized in Example 3, there were employed 2.95 parts of 2-allylphenol prior to phosgenation, and 5 parts of 2-allylphenol at the termination of the phosgenation reaction. The copolymer was found to have tensile of 294 p.s.i. and an elongation of 250 percent. The above-described allyl terminated copolymer of Example 3, (A) and the allylphenol terminated copolymer (B) were then converted by the following procedure to room temperature vulcanizing compositions.

A mixture of 50 parts of the unsaturated copolymer (A), 250 parts of toluene and 0.0028 part of platinum in the form of a platinum complex shown in Lamoreaux Patent 3,220,972 was heated to 90° C. There were then added incrementally over a period of several days, 7.6 parts of methyldiacetoxysilane to the solution. The addition was performed under substantially moisture-free conditions. After the addition was completed, 5 parts of the solution were placed in an aluminum cup with 0.02 part of stannous octoate, and exposed to the atmosphere. A tack-free film was formed after 4 hours. After 24 hours, a slab was cut from the film.

The above procedure was repeated except that the unsaturated copolymer (B) was substituted for (A). The addition of the acetoxysilane was performed in 10 minutes. The mixture was heated at 85° C.–90° C. for nine hours. Thirty-five parts of the solution to which 0.14 part of dibutyltindilaurate had been added was poured into an aluminum tray and exposed to the atmosphere. It was tack-free after 4 hours.

The table below shows the results obtained with the unsaturated copolymer, "Uncured," and the resulting cured copolymer, "Cured," with respect to "T" tensile (p.s.i.) and "E" elongation (percent).

|   | Uncured | | Cured | |
| --- | --- | --- | --- | --- |
|   | T | E | T | E |
| A | 185 | 175 | 800 | 330 |
| B | 294 | 250 | 825 | 175 |

Example 5

There are added at a temperature of 90° C., 294 parts of a polydimethylsiloxane of the average formula,

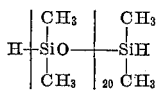

to a mixture of 60 parts of 2-allylphenol and 0.0014 part of platinum as a chloroplatinic acid-alcoholate complex. The mixture is stirred for a period of about 3 hours while maintaining a temperature between 90° C. to 115° C. An infrared spectrum of a portion of the mixture shows it is free of silicon hydride. The mixture is allowed to cool to room temperature. A product is recovered by extraction with methylene chloride followed by washing the extract with a solution of 4 parts of methanol per part of water. The product is dried with anhydrous sodium sulfate and stripped of solvent to a temperature of 115° C. in vacuo. Based on method of preparation the product is a polydimethylsiloxane having the average formula,

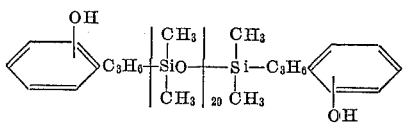

Following the procedure of Example 1, phosgene was passed into a mixture of 114 parts of 2,2-bis-(4-hydroxyphenyl)propane, 1340 parts of methylene chloride, 130 parts of pyridine, and 218 parts of the above polydimethylsiloxane.

After the phosgenation of the mixture, an additional 670 parts of methylene chloride were added. The mixture was hydrolyzed by stirring it with water. It was then washed with dilute hydrochloric acid to remove the excess pyridine. After washing free of chloride ions with distilled water, the product was precipitated by addition of methanol. Based on method of preparation, the product was a saturated organopolysiloxane-polycarbonate copolymer having terminal OH radicals. It was composed of about 63 percent by weight of organopolysiloxane composed of polydimethylsiloxane blocks having terminal

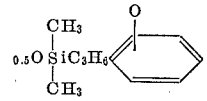

units chemically combined with about 37 percent by weight of polycarbonate blocks based on the weight of copolymer.

The above copolymer is calendered onto a glass cloth. The resulting composite is found to exhibit valuable insulating and mechanical properties.

Example 6

A mixture of 700 parts of the hydroxybutyldimethylsiloxy terminated polydimethylsiloxane of Example 1, 562 parts of octamethylcyclotetrasiloxane, 34.4 parts of 2,4,6,8 - tetramethyltetravinylcyclotetrasiloxane and 1.3 parts of potassium hydroxide was stirred at a temperature of 180° C. for about 2 hours. After the mixture was cooled to room temperature, it was mixed with about 6 parts of concentrated hydrochloric acid. After the mixture was agitated for 1 hour, 20 parts of sodium bicarbonate were slowly added. The mixture was then filtered and the product was stripped to 180° C. at 4 torr. Based on method of preparation, the product was a hydroxybutyldimethylsiloxy terminated polydiorganosiloxane having an average of about 40 chemically combined diorganosiloxy units consisting essentially of dimethylsiloxy units and about 2.5 mole percent of methylvinylsiloxy units based on the total diorgansiloxy units.

A mixture of 57 parts of 2,2-bis-(4-hydroxyphenyl)-propane, 1340 parts of methylene chloride, 75 parts of pyridine and 75 parts of the above hydroxybutyldimethylsiloxy terminated polydiorganosiloxane was phosgenated for about 2.25 hours at a temperature between 26° C. to 39° C.

The mixture then was treated with methanol to destroy excess phogene and chlorocarbonate end groups. A product was precipitated by addition of several volumes of methanol, and it was washed three times as shown above in Example 1. Based on method of preparation, the product was a saturated organopolysiloxane-polycarbonate copolymer having terminal methylcarbonate linkages. It was composed of about 54 percent by weight of organopolysiloxane composed of polydiorganosiloxane blocks having terminal

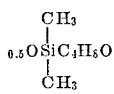

units chemically combined with about 46 percent by weight of polycarbonate blocks based on the weight of copolymer. A 90 percent yield of copolymer was obtained based on the weight of starting reactants.

The copolymer is dissolved in chloroform. The solution is poured onto a tin-plated steel panel which is warmed to effect the evaporation of solvent. A rubbery film is formed. The film is placed between two glass plates and heated to 250° C. while subjected to a pressure of 2 p.s.i. A glass laminate is formed which does not shatter when fractured.

Example 7

A mixture of 1 mole of tetramethyl-1,3-bs(γ-carboxypropyl)disiloxane and 50 moles of octamethylcyclotetrasiloxane were equilibrated for 2 hours at 100° C. utilizing 3 percent by weight of 86% concentrated sulphuric acid based on the weight of the mixture. The mixture was cooled and the organopolysiloxane product was separated from the acid in a separatory funnel. The organopolysiloxane polymer was then washed 4 times with warm salt water. The polymer was dried with sodium sulfate and filtered. It was heated in the absence of atmospheric moisture with thionyl chloride which was utilized in an amount sufficient to convert the carboxy of the polymer to the acid chloride. There also was utilized sufficient calcium carbonate to neutralize and absorb the hydrogen chloride produced during the reaction. The mixture was heated for about 3 hours. Pyridine was added dropwise until no more pyridine hydrochloride formed. Then a small amount of carbon black was added to the mixture and it was filtered while it was maintained under substantially anhydrous conditions. Based on method of preparation, there was obtained a polydimethylsiloxane having the average formula

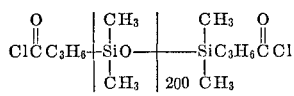

There were added 200 parts of the above polydimethylsiloxane having the terminal

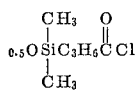

units to a mixture of 114 parts of 2,2-bis(4-hydroxyphenyl)propane, 130 parts of pyiridine, and 3400 parts of methylene chloride over a period of about 30 minutes. To the resulting solution phosgene was added over a period of about 60 minutes at a rate of about 0.7 part per minute, and then a period of about 15 minutes at a rate of about 0.23 part per minute. Phosgenation was continued until the mixture achieved a maximum viscosity.

Anhydrous ethanol was added to the mixture followed by sufficient methanol to precipitate all of the resulting product. The resulting product then was washed 4 times with methanol and dried overnight at 100° C. The product was cast from a methylene chloride solution and a strong tough film was formed. Based on method of preparation the product was a saturated copolymer having terminal

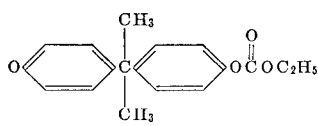

radicals. It was composed of about 61 percent by weight of organopolysiloxane composed of polydimethylsiloxane blocks having terminal

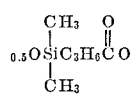

units chemically combined with about 39 percent by weight of polycarbonate blocks based on the weight of copolymer. It had a tensile strength of 1870 p.s.i. and an elongation of 120 percent.

Example 8

Phosgene was passed into the mixture of 23 parts of 2,2-bis(4-hydroxyphenyl)propane, 390 parts of methylene chloride, 30 parts of pyridine, and 30 parts of a carboxypropyldimethylsiloxy terminated polydimethylsiloxane having an average of about 8 chemically combined dimethylsiloxy units, while the mixture was being vigorously agitated. The temperature of the mixture rose to 42° C. over a period of 45 minutes during the addition. After a total reaction time of 2.5 hours, 500 parts of methanol were added to the mixture. The methanol reacted with excess phosgene and chlorocarbonate end groups, dissolved the pyridine hydrochloride which had formed during the reaction, and at the same time effected the precipitation of product. The product was washed four times with methanol and then dried at 85° C. for several hours. Based on its method of preparation, the product was a saturated copolymer having terminal methyl carbonate radicals composed of about 54 percent by weight of organopolysiloxane of polydimethylsiloxane blocks having terminal

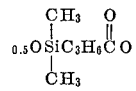

units chemically combined with about 46 percent by weight of polycarbonate based on the weight of copolymer. It was obtained in 80 percent yield. A film of the copolymer was cast in chloroform. The copolymer showed an average tensile at break of 845 p.s.i. and an average elongataion of 90 percent.

Example 9

Phosgene was passed into a mixture of 6 parts of the hydroxybutyldimethylsiloxy terminated poly(dimethylsiloxane) of Example 1, 114 parts of 2,2-bis(4-hydroxyphenyl)propane, 130 parts of pyridine and 2670 parts of methylene chloride. The mixture was phosgenated for 1 hour at a rate of about 0.7 part per min. During this time the temperature rose from 25° C. to 37° C. The phosgene was allowed to flow in for 20 additional minutes at a reduced rate of about 0.2 part per min. The gas flow continued at a reduced rate until phosgene was detected in the exit gases. At that point, 20 parts of anhydrous ethanol was added to eliminate chlorocarbonate end groups and excess phosgene. There was then added an excess of methanol to precipitate product. This product was washed four times with methanol and then dried overnight at 100° C. There was obtained a yield of 88 percent product. Based on the method of preparation, the product was a saturated copolymer having terminal ethyl carbonate radicals of about 4.5 percent by weight of organopolysiloxane composed of polydimethylsiloxane blocks having terminal 4-butyldimethylsiloxy units chemically combined with 95.5 percent by weight of polycarbonate blocks based on the weight of copolymer. A film was cast of the copolymer from chloroform solution. A slab showed a tensile strength of 7325 p.s.i. at an elongation of 125 percent at 25° C.

Example 10

There were added dropwise over a period of 2 hours 55.5 parts of water to a solution of 400 parts of dimethyldichlorosilane in 290 parts of diethyl ether. The mixture was heated at reflux with stirring for an additional 1.5 hours. It was then stripped of solvent to obtain a product containing 1.56 percent hydrolyzable chlorine. Based on method of preparation, it was a chlorine chain-stopped polydimethylsiloxane having an average of about 60 chemically combined dimethylsiloxy units.

A solution of 600 parts of the above polydimethylsiloxane in 134 parts of methylene chloride was added, with stirring over a period of about 1 hour, to a mixture of 114 parts of 2,2-bis(4-hydroxyphenyl)propane, 130 parts of pyridine, and 2700 parts of methylene chloride. There was then added 1.5 part of allyl alcohol to the mixture. The mixture was then phosgenated for about four hours. The mixture was then purged with nitrogen to remove excess phosgene. Then 8.6 parts of allyl alcohol were added to react with chlorocarbonate end groups. A product was precipitated by the addition of methanol. There were obtained 612 parts of product after the precipitate had been washed four times with methanol and dried at 100° C. Based on method of preparation, the product was an unsaturated copolymer having terminal allyl carbonate radicals composed of about 83 percent by weight of organopolysiloxane consisting of polydimethylsiloxane blocks chemically combined with about 17 percent by weight of polycarbonate blocks based on the weight of copolymer.

A mixture of 100 parts of the above unsaturated copolymer, 40 parts of fume silica and 2 parts of dicumylperoxide were milled together. A milled sheet was then press-cured for 20 minutes at 340° F. and post-cured 2 hours at 200° C. A comparison between the uncured copolymer and the cured copolymer with respect to "S," solubility in methylene chloride, "T," tensile (p.s.i.), and "E," elongation (percent) is shown below.

|  | S | T | E |
|---|---|---|---|
| Uncured | Soluble | 58.5 | 83 |
| Cured | Insoluble | 990 | 100 |

A comparison also is made with a saturated copolymer having terminal ethylcarbonate radicals and the same weight percent organopolysiloxane as the above shown unsaturated copolymer. The uncured saturated copolymer shows about the same T and E as the above uncured unsaturated copolymer. A milled mixture of the saturated copolymer made by the same procedure shown above remains soluble in methylene chloride after an attempt is made to cure it by the above procedure.

Example 11

There were added over a period of about two hours with stirring, a solution of 52 parts of water in 79 parts of acetone to 400 parts of dimethyldichlorosilane. The resulting mixture was heated to a temperature of 51° C. over a period of about 1.5 hours. The solution was then stripped under reduced pressure to obtain 187 parts of a chlorine chain-stopped fluid containing 2.44 percent by weight of hydrolyzable chlorine. Based on method of preparation the resulting chlorine terminated polydimethylsiloxane was composed of about 39 chemically combined dimethylsiloxy units.

A solution of 23 parts of the above polydimethylsiloxane in 70 parts of methylene chloride was added dropwise, with stirring over a period of 20 minutes to a mixture of 114 parts of 2,2-bis(4-hydroxyphenyl)propane, 1340 parts of methylene chloride, and 130 parts of pyridine. When this addition was complete 0.86 part of allyl alcohol was added. Phosgene was passed into the stirred mixture for about 2.5 hours. An additional 7.5 parts of allyl alcohol were added. Following the procedure of Example 10, 130 parts of product were recovered. Based on method of preparation, the product was a copolymer composed of 15 percent by weight of organopolysiloxane consisting of polydimethylsiloxane blocks chemically combined with 85 percent by weight of polycarbonate blocks based on the weight of copolymer.

A sheet of the above rigid copolymer is cast from methylene chloride. A composite is made by wetting the surface of the sheet with additional methylene chloride and contacting the wetted surface of the sheet with a sheet made from the rubbery copolymer of Example 10. An integral composite is formed having a rigid side and a soft rubbery side. Those skilled in the art would know that such a composite could be employed in denture applications. In addition, other composites of rigid copolymers having from 65 to 99 percent by weight of chemically combined polycarbonate with from 1 to 35 percent by weight of organopolysiloxane which would provide for the rigid side, integrally bonded to rubbery copolymers composed of from 50 to 95 percent organopolysiloxane chemically combined with from 5 to 50 percent by weight of polycarbonate which would provide for the rubbery side, also could be utilized in a variety of applications such as denture plates having soft rubbery liners.

Example 12

There are added 225 parts of the chlorine chain-stopped polydimethylsiloxane of Example 2 in 130 parts of methylene chloride to a mixture of 76.5 parts of bis-(4-hydroxy-3,5-dimethylphenyl)sulfone, 130 parts of pyridine and 1300 parts of methylene chloride over a period of 50 minutes. There is then added to the mixture, 57 parts of 2,2-bis(4-hydroxyphenyl)propane, and 1.3 parts of allyl alcohol. The mixture is then phosgenated until unreacted phosgene is detected in the exit gases. An additional 8.5 parts of allyl alcohol is then added to the mixture. A copolymer having terminal

joined to polycarbonate blocks is precipitated with methanol in accordance with the previously described procedure. Based on the method of preparation, the copolymer is composed of 61 percent by weight of organopolysiloxane composed of polydimethylsiloxane blocks chemically combined with 39 percent by weight of polycarbonate blocks by linkages, e.g.

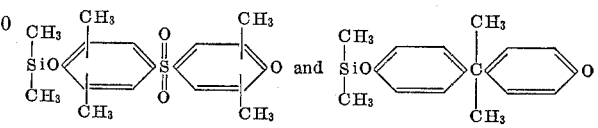

A film of the copolymer is cast from methylene chloride. It shows valuable elastomeric and insulating properties.

Those skilled in the art would know that the above examples show that the copolymers of the present invention provide for a host of useful materials which can be utilized in a variety of applications. The copolymers of the present invention are unique materials inasmuch as the valuable properties of organopolysiloxanes are further enhanced by the presence of polycarbonate blocks which provide for substantial improvement of strength. The superior heat stability and low temperature properties of organopolysiloxane are imparted to the polycarbonate. The resulting thermoplastic materials which can be extruded, or cast as films from organic solvent solution provide for elastomers, fibers, films and composites of rigid and rubbery materials.

The unsaturated copolymers of the present invention further provide for the additional advantage of converting the copolymers from thermoplastic materials to cured products by the employment of conventional room temperature curing agents, peroxide curing catalysts, platinum addition reactions, etc. The resulting cured products have higher strength and toughness and are rendered insoluble in organic solvents. The copolymers of the present invention having R"Y linkages between the organopolysiloxane blocks and polycarbonate blocks also have improved hydrolytic stability compared to organopolysiloxane-polycarbonate copolymers of the prior art.

While the foregoing examples have been limited to only a few of the very many variables within the scope of the present invention, it should be understood that the present invention covers a much broader class of copolymers consisting essentially of organopolysiloxane blocks of chemically combined units of Formula 2 and the reaction product of a dihydroxy compound of Formula 3 and a carbonyl halide or diaryl carbonate.

The examples also have of necessity been directed to only a few of the very many process variables which can be utilized in the practice of the present invention. It should be understood however, that the process of the present invention is illustrated by both the specific examples given as well as by the detailed description of the present invention which preceded these examples.

What I claim as new and desire to secure by Letters Patent of the United States is:

1. A method which comprises (1) phosgenating a mixture of a dihydroxy compound of the formula,

HOZOH and an organopolysiloxane of the formula, $$Y' - \left[ \begin{matrix} R' \\ | \\ SiO \\ | \\ R' \end{matrix} \right]_n - \begin{matrix} R' \\ | \\ SiY' \\ | \\ R' \end{matrix}$$

and a member selected from the class consisting of monohydroxy compound of the formula,

ROH and an aliphatically unsaturated monohydroxy compound of the formula, $$CV_a - C R''OH^{V_b}$$

and (2) recovering from the resulting mixture of (1) an organopolysiloxane-polycarbonate copolymer, where R is selected from the class consisting of hydrogen and monovalent organo radicals free of aliphatic unsaturation, R' is selected from the class consisting of monovalent hydrocarbon radicals, halogenated monovalent hydrocarbon radicals, and cyanoalkyl radicals R" is selected from the class consisting of divalent hydrocarbon radicals and halogenated divalent hydrocarbon radicals, V is selected from the class consisting of hydrogen, monovalent hydrocarbon radicals and halogenated monovalent hydrocarbon radicals, Y' is selected from

—OZOH, —R"OH, —R"OCOZOH

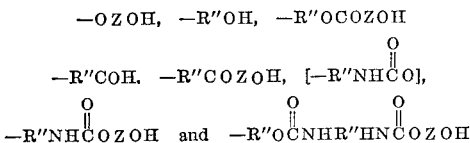

Z is a member selected from the class consisting of R" and R"QR", Q is a divalent radical selected from the class consisting of oxyaryleneoxy radicals, sulfonyl, sulfinyl, oxy and thio, $a$ is 1 or 2, $b$ is 0 or 1, $$CV_a - C^{V_b}$$

is part of a monovalent unsaturated aliphatic or cycloaliphatic radical, and $n$ is an integer equal to 5 to 500, inclusive.

2. Compositions comprising organopolysiloxane-polycarbonate block copolymers having terminal monovalent aliphatically unsaturated organo radicals of the formula, $$CV_a - C R''Y^{V_b}$$

which comprise (A) from 1 to 95 percent by weight of organopolysiloxane blocks consisting essentially of chemically combined diorganosiloxy units of the formula, R'$_2$SiO and (B) from 5 to 99 percent by weight of blocks of the reaction product of a dihydroxy compound of the formula,

HOZOH and a member selected from the class consisting of a carbonyl halide and a diaryl carbonate, where R' is selected from the class consisting of monovalent hydrocarbon radicals, halogenated monovalent hydrocarbon radicals, and cyanoalkyl radicals, R" is selected from the class consisting of divalent hydrocarbon radicals and halogenated divalent hydrocarbon radicals, Z is selected from the class consisting of R" radicals and R"QR" radicals. Q is selected from the class consisting of divalent oxyaryleneoxy, sulfonyl, sulfinyl, oxy and thio, Y is selected from the class consisting of —O—,

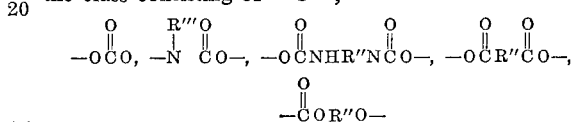

and

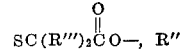

is selected from the class consisting of hydrogen, or an alkyl radical, V is selected from the class consisting of hydrogen, monovalent hydrocarbon radicals and halogenated monovalent hydrocarbon radicals, $a$ is 1 or 2, and $b$ is 0 or 1.

3. A composition in accordance with claim 2 where said organopolysiloxane is composed of blocks having terminal units selected from the class consisting of

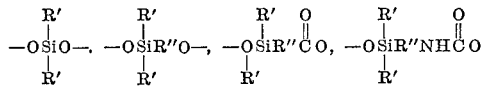

and

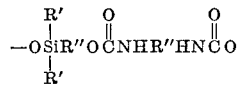

where R' is selected from the class consisting of monovalent hydrocarbon radicals, halogenated monovalent hydrocarbon radicals, and cyanoalkyl radicals, and R" is selected from the class consisting of divalent hydrocarbon radicals and halogenated divalent hydrocarbon radicals.

4. Compositions comprising copolymers having terminal radicals of the formula, $$CV_a - C R''Y^{V_b}$$

which copolymers comprise (A) from 1 to 95 percent by weight of organopolysiloxane blocks consisting essentially of chemically combined units of the formula, R'$_2$SiO and (B) from 5 to 99 percent by weight of blocks of the reaction products of a bisphenol of the formula,

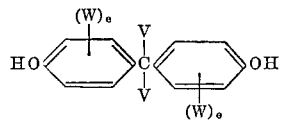

and a carbonyl halide, where V is selected from the class consisting of hydrogen, monovalent hydrocarbon radicals and halogenated monovalent hydrocarbon radicals, R' is a member selected from monovalent hydrocarbon radicals, halogenated monovalent hydrocarbon radicals, and cyanoalkyl radicals, R" is selected from the class consisting of divalent hydrocarbon radicals and halogenated divalent hydrocarbon radicals, W is selected from alkyl radicals and halogen radicals, Y is a divalent non-polar radical, $a$ is 1 or 2, $b$ is 0 or 1, and

can be part of a monovalent unsaturated aliphatic or cycloaliphatic radical.

5. A composition in accordance with claim 4 where the bisphenol is 2,2-bis(4-hydroxyphenyl)propane.

6. A composition in accordance with claim 4 where the organopolysiloxane blocks consist essentially of chemically combined dimethylsiloxy units.

7. A composition in accordance with claim 4 where the organopolysiloxane is composed of blocks having terminal units selected from the class consisting of

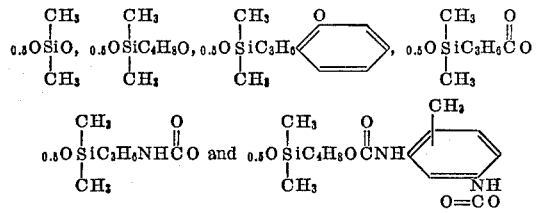

8. A composition in accordance with claim 4 where the terminal radicals are allyl carbonate.

9. Compositions comprising organopolysiloxane-polycarbonate block copolymers having terminal radicals of the formula, $$RO$$

where R is selected from the class consisting of hydrogen and monovalent organo radicals free of aliphatic unsaturation, which comprise (C) from 1 to 95 percent by weight of organopolysiloxane blocks consisting essentially of chemically combined diorganosiloxy units of the formula, $$R'_2SiO$$

and terminal units of the formula,

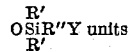

and (D) from 5 to 99 percent by weight of blocks of the reaction product of a dihydroxy compound of the formula, $$HOZOH$$

and a member selected from the class consisting of a carbonyl halide and a diaryl carbonate, where R' is a member selected from the class consisting of monovalent hydrocarbon radicals, halogenated monovalent hydrocarbon radicals, and cyanoalkyl radicals, R'' is selected from the class consisting of divalent hydrocarbon radicals and halogenated divalent hydrocarbon radicals, Z is a member selected from the class consisting of R'', and R''QR'', Q is a divalent radical selected from the class of oxyaryleneoxy, sulfonyl, sulfinyl, oxy, and thio, Y is selected from the class consisting of

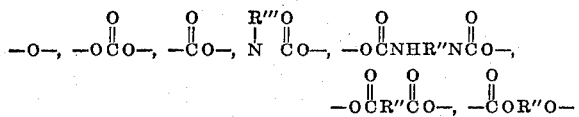

and

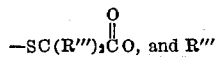

is selected from the class consisting of hydrogen or an alkyl radical.

10. Compositions comprising organopolysiloxane-polycarbonate block copolymers having terminal radicals of the formula, $$RO$$

where R is selected from the class consisting of hydrogen and monovalent organo radicals free of aliphatic unsaturation, which comprise (C) from 1 to 95 percent by weight of organopolysiloxane blocks consisting essentially of chemically combined diorganosiloxy units of the formula, $$R'_2SiO$$

and terminal units of the formula,

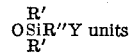

and (D) from 5 to 99 percent by weight of blocks of the reaction product of bisphenol of the formula,

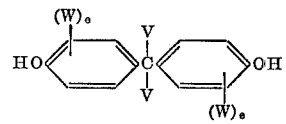

and a carbonyl halide, where R' is a member selected from the class consisting of monovalent hydrocarbon radicals, halogenated monovalent hydrocarbon radicals and cyanoalkyl radicals, V is selected from the class consisting of hydrogen, monovalent hydrocarbon radicals and halogenated monovalent hydrocarbon radicals, W is selected from the class consisting of alkyl radicals and halogen radicals, and $e$ is a whole number equal to 0 or 1.

11. A composition in accordance with claim 10 where the bisphenol is 2,2-bis(4-hydroxyphenyl)propane.

12. A composition in accordance with claim 10 where the organopolysiloxane blocks consist essentially of chemically combined dimethylsiloxy units.

13. A composition in accordance with claim 10 where the organopolysiloxane is composed of blocks having terminal units selected from the class consisting of

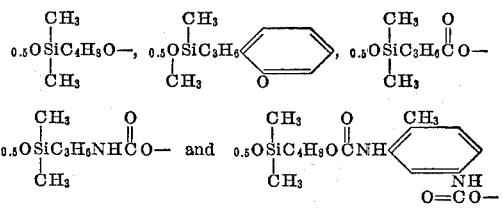

14. A composition in accordance with claim 10 having terminal methoxy radicals.

References Cited

UNITED STATES PATENTS

| 3,189,662 | 6/1965 | Vaughn | 260—824 |
| 3,207,814 | 9/1965 | Goldberg | 260—824 |

FOREIGN PATENTS

| 940,419 | 10/1963 | Great Britain. |
| 697,657 | 11/1964 | Canada. |
| 703,921 | 2/1965 | Canada. |

MURRAY TILLMAN, *Primary Examiner.*

PAUL LIEBERMAN, *Assistant Examiner.*

U.S. Cl. X.R.

260—47, 46.5, 77.5, 33.2, 33.8, 37; 117—135.1, 127